Dec. 9, 1969    P. EISLER    3,483,358
ELECTRICALLY HEATABLE PACKAGE
Original Filed April 13, 1961    6 Sheets-Sheet 1

INVENTOR
Paul Eisler
BY *A. J. O'dell*
ATTORNEY

INVENTOR
Paul Eisler
BY
ATTORNEY

Fig. 16.

United States Patent Office 3,483,358
Patented Dec. 9, 1969

3,483,358
ELECTRICALLY HEATABLE PACKAGE
Paul Eisler, 57 Exeter Road, London NW. 2, England
Continuation of application Ser. No. 102,820, Apr. 13, 1961. This application Nov. 17, 1967, Ser. No. 684,068
Claims priority, application Great Britain, Apr. 14, 1960, 13,383/60
Int. Cl. F27d 11/00; H05b 3/06
U.S. Cl. 219—385                              1 Claim

ABSTRACT OF THE DISCLOSURE

A dispensible package of a material to be heated including a low voltage electric heating film and means whereby mechanical forces can be applied to the container, the substance and/or the film without destroying the container to effect a change in relative position, for instance stripping of the substance from the film as it is drawn out of the package or movement of the substance from a position for transport to a position for heating. The invention is applicable to a plastic material packed in a collapsible tube.

This is a continuation of application Ser. No. 102,820, filed Apr. 13, 1961, now abandoned.

The present invention relates to packages of substances in dispensible containers, including any closures and attachments to said containers, said substances requiring to be heated and manipulated for use, and comprises the combination of said dispensible container, dispensible low-voltage type electric heating film means at least partly within the outer walls of the complete package and having terminal areas by which connection can be made to a supply and the substance be heated while in the container, and provision associated with the container for effecting the required manipulation of at least part of the substance. In general the manipulation will be a mechanical displacement of at least part of the substance in relation to the package as a whole. Such displacement may be necessary before or after connection of the heating film to the supply and may take place wholly within the package or may include discharge from the package.

Foodstuff is one of the important types of substances to which the invention applies and the invention will be described for the most part by reference to its application to food packs in several varieties sufficiently numerous, diverse and illustrative to make it readily understandable to one skilled in the art and applicable by him to many other varieties as well and also to packages of other substances than foodstuff. A detailed description of many varieties of packages and of the many foodstuffs and substances other than foodstuffs to which the invention applies is therefore not necessary but a few examples of such substances will also be briefly described.

The invention is applicable to most substances supplied in dispensible containers which it is desired to heat immediately prior to use. The invention combines three elements, firstly the dispersible container, secondly the dispensible low-voltage type heating film means for electrically heating the substance and thirdly the provision for manipulating at least part of the substance. This provision being the third of the elements referred to above is in the simplest case an edge of, or a slit in, the container in line contact with the heating film so that after the heating is completed the film can be pulled out over the edge or through the slit and thereby cleaned of adherent hot substance. The heating film means which form the second element referred to above of the combination of the present invention comprises one or more thin sheets of material which are heated by the passage of an electric current through it. The heating film can simply be a piece of metal foil, for instance aluminum foil, slotted in such a way as to provide a zig-zag path of suitable resistance to the electric current, but generally it comprises at least two layers, an electrically conductive layer and a supporting insulating layer, the electrically conductive layer alone being not sufficiently self-supporting or requiring insulation to prevent objects having direct contact with it. In the heating film used in the invention the insulating layer is usually a thin plastic film, a thin sheet of ordinary paper or asbestos paper. The conductive layer can be a layer of carbon or graphite or other semi-conductor, but is preferably a metal foil pattern with a number of parallel meander paths. Usually the heating film comprises more than two layers. The metal foil pattern may be sandwiched between two thin plastic films or sheets of paper, or may be bonded, for instance between two aluminum foils, the inside of which has been anodised or otherwise safely insulated. The area covered by the gaps in the foil pattern is very small so that nearly the whole film area generates heat and hot spots do not occur. The film is run at a low voltage which is safe to touch, e.g. below 50 volts.

The film has terminal areas where the foil pattern is bare and the foil may be crimped, coated, folded, perforated etc. As may be more convenient in any particular case, the terminal areas can be located at the same end or opposite ends of the film and in the same surface or opposite surfaces. It is preferred that as far as applicable its construction and method of manufacture are on the lines described in my Patents Nos. 2,971,073, 3,020,378, 3,026,234, 3,033,978 and application Ser. Nos. 749,554 filed July 18, 1958; 783,609 filed Dec. 29, 1958; 789,221 filed Dec. 29, 1958 and 75,453 filed Dec. 12, 1960.

A particularly suitable type of heating film for use in the present invention is described in my application Ser. No. 115,736, filed Jan. 12, 1962. It is described in greater detail below with reference to FIGURES 12, 13, 14 and 15.

The first enumerated element of the combination of the present invention namely the dispensible container can be of a standard type and shape as the heating film need not be used as the container wall itself, but is disposed within the outermost wall surfaces of the package, that is either on the inside surface of part or the whole of the package wall or inside the container spaced from the wall.

The present invention enables the material used for enveloping the substance to be practically free from all limitations which are imposed on it if the wrapping material serves either as a heating film itself or as a boiling bag or foil pack which transmits heat to the substance from an outside medium, be it water, the hot air of an oven, or the surface of a hot plate. Nearly all present packing materials, styles and decorative sales features, can be used, but if the wrapping material should not be capable of resisting the temperature of the heated food or other substance, it can still be used, if the wrapping is removed or brought out of contact with the substance before the heating film is switched on. Opening of the pack when it is cold is often required irrespective of the nature of the wrapping material for reason of ease of handling, prevention of vapour pressure within the pack, or for better cooking results. There is no need to use comparatively thick and strong wrapping materials as in boiling bags or foil packs only for heating purposes, if it is not desired for some other reason.

The invention provides means for achieving standard rates of heating- and/or thawing-times for wide ranges of food packs of different type, weight, size, shape and enveloping material which require, or would require, different temperature cycles for heating. While these features of size, shape, material etc. are important parameters of the heating cycle and of the heating time of the food pack, they are often determined and chosen for considerations of sales appeal, of the manufacture or storage of the food pack, or for other reasons not concerned with its heating or thawing. Even less concern is often given to the achievement of the heating of any particular food pack within the same standard time as other packs without individual control and regulation facilities incorporated in the heating equipment.

The problem of avoiding individual attention to and adjustment of the heating process as far as heating time and heating cycle of a wide variety of different food packs is concerned, is solved by the present invention by associating with each food pack a heating film designed for the particular pack and associated with it in such a way that it balances the individual parameters of that food pack to the standard level, thus permitting the food pack to be heated and/or thawed by the same simple equipment and in the same time as a wide range of other food packs differing from it in at least one factor of substantial influence on the heating of the food pack.

In the present invention the heating film means is not only associated with the food or other substance and the package in a manner to transmit heat to the substance from its entire surface, but is also associated with a device or manipulating provision which may for example facilitate the handling of the film either during the heating or afterwards when it is being dissociated from the food. This device or material is preferably dispensible together with the heating film, but need not be made so flimsy that it is destroyed when used once. However, even if intact after use, it should not be re-used but treated as dispensible for hygienic and economic reasons.

The invention affords improvements in the known varieties of heatable food packs and provides for the supply of food packs which are particularly suitable for being heated in the plate, at the dinner table or on a tray, in the motor car, plane or train, in the camp or canteen when they are served directly from the refrigerator or other store.

Some of these and other varieties of combination of dispensible container, heating film means and manipulating means will be described in greater detail below with reference to examples illustrated in the accompanying diagrammatic drawings in which—

In general the thickness of the heating film has been exaggerated for the sake of clearness.

Figure 1:
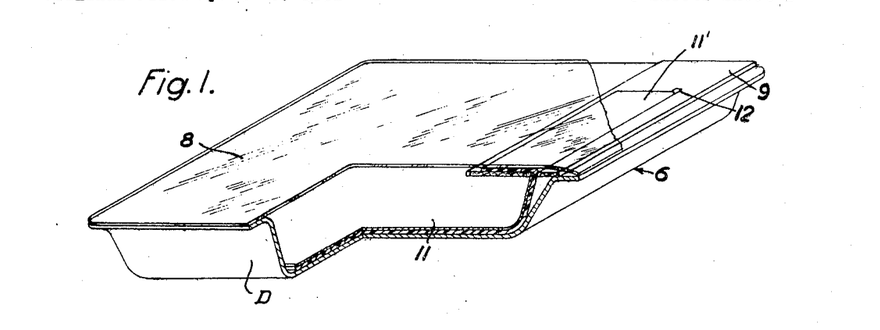
FIGURES 1, 2, 3 and 4 are perspective views partly cut away, of four simple embodiments of the invention.
Figure 2:
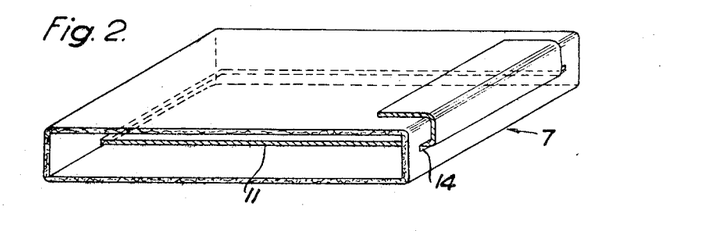

In the simplest cases, typified by FIGURES 1 and 2, a heating film 11 is placed inside a package 6, FIGURE 1 or in the food (or other substance) held in a package 7, FIGURE 2. The package itself or part of it may be an eating or drinking appliance such as a plate or beaker. In FIGURE 1 for instance (as in some other examples described later) the package 6 is made up of a dispensible plate or dish D which is completed by a cover 8 which may be of transparent or decorated material. In these two examples as in many others, the film 11 operates as a large-surface low-inertia type of contact or immersion heater.

Before the food is eaten or if the food is emptied into another container after heating, the heating film has to be removed and this operation is bound to be objectionable if the film is not prevented from dragging with it more than a layer of food which is too thin or too firm to drip from it.

Figure 3:
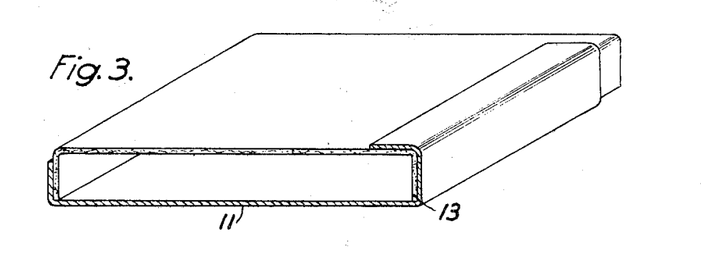

The present invention provides therefore for the association of the immersion type of heating film with a material or device which has a stripping action on the film when it is removed from the hot food. A loose piece of cardboard 9 FIGURE 1 for instance, placed at one edge of the food package or eating appliance which has a slit 12 in it of about the same length as the width of the film and through which the film has to be pulled on removal serves the purpose. Other examples are the provision of a cardboard edge or an edge formation 13 FIGURE 3 on a packet for which the film 11 serves as a closure (being lapped over the one end of the packet to form accessible terminals and secured by a thermo-softening adhesive to permit ready detachment when hot) or an opening in the food wrapper itself over, under, or through which the heating film has to be removed. Another possibility is the provision of squeezing means as with large collapsible tubes from which the food is squeezed out while the film is fixed and remains in the package.

Figure 4:
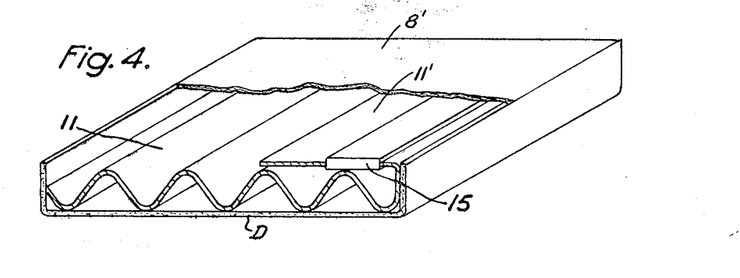
Figure 5:
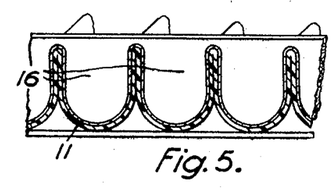
FIGURE 5 is a part view in perspective of another simple embodiment
Figure 6:
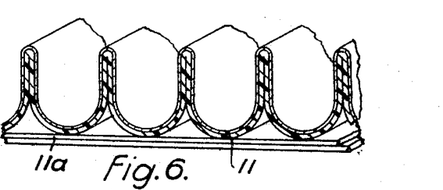
FIGURE 6 is a modification of FIGURE 5
Figure 7:
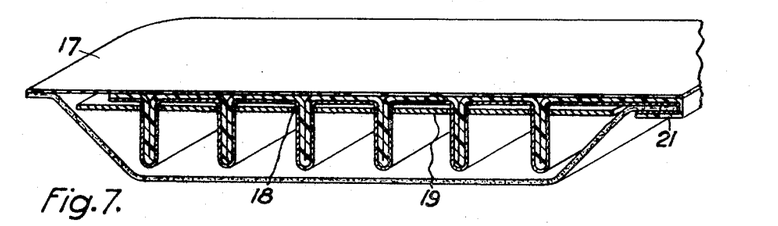
FIGURE 7 is a part view in perspective of an alternative to FIGURE 5

With many foods it is possible to arrange the heating film 11 to be positioned as a flat sheet between two thin layers of food as in FIGURE 2. In such a case the pulling out of the film can be readily effected through a slit in one end of the package. Before use the end of the film projects to provide terminals and a portion which can be taken hold of for pulling out. In many packages, however, exemplified in FIGURES 4 to 9 the film has to be folded into a form presenting a series of waves: FIGURE 4, L's; FIGURES 5 to 9 honeycombs or other configurations in order to provide adequate heating surface for the food without the film itself reaching an undesirably high temperature. In such cases the stripping can be done by drawing the film through a sleeve 15 FIGURE 4, the sleeve being secured at its ends to the dish D, or over the shaped edge of a strip 16 of cardboard FIGURE 5, the strip 16 being secured in one side of the package or by an opening in the packaging material having an edge of the same cross-section. To facilitate manipulation a cross-piece 11a may be bonded to the film as shown in FIGURE 6. In FIGURE 4 the terminals are incorporated in the portion 11' of the film which is originally passed through the sleeve 15. Access to it for folding up and making connection to the supply is obtained by tearing open the thin cover layer 8'. FIGURES 5 and 6 do not show the margin of the film with the terminal areas but they can be arranged as in FIGURE 1 or 4 (without the loose piece of cardboard 9 or the sleeve 15) or as in FIGURE 7. In the case of a package the lower part of which is in the form of a plate as in FIGURE 7, the webs of the U's may be flat and bonded to a cover 17, while the limbs of the U's pass through corresponding slots 18 in a stripper 19 secured to the package. At one end the film has terminals 21 for making connections, which pass out between the cover 17 and edge of the plate, and are wrapped over; they are unfolded when connection is to be made, while when heating is completed the cover is detached from the plate and the limbs of the film are drawn through the slots 18 and thus stripped of adherent foodstuff.

Figure 8:
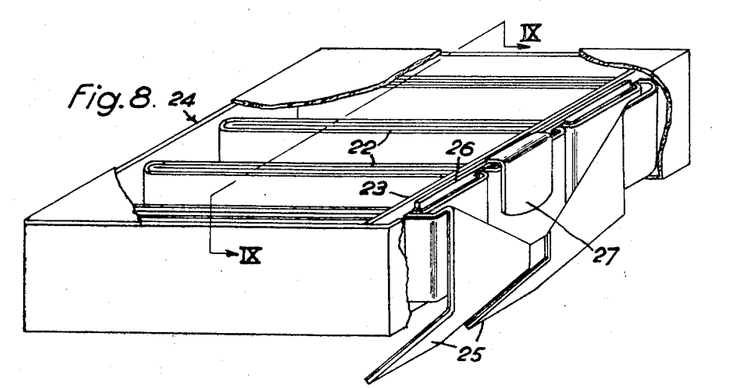
FIGURE 8 is a perspective view partly cut away and FIGURE 9 a detail section on the plane IX—IX of FIGURE 8
Figure 9:
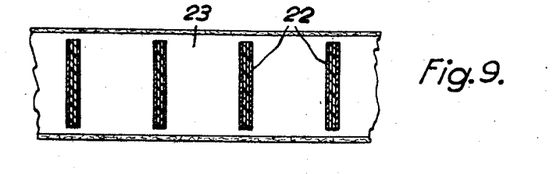
Figure 10:
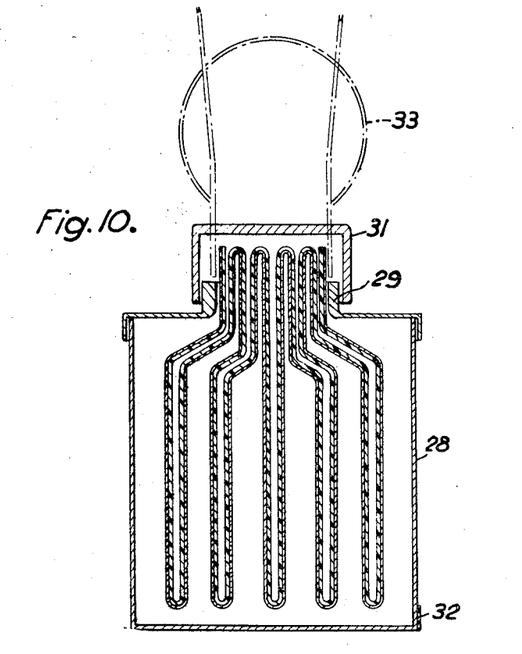
FIGURE 10 is a section of yet another simple embodiment

In FIGURES 8 and 9 a film bent into U's is again used but the limbs 22 extend through slots in a stripper plate 23 and across the box 24. Terminals 25 are folded over prior to use while a stiff strip 26 is secured to the film to enable its limbs conveniently to be drawn out through the stripper plate. The strip 26 may have a handling tab 27 normally within the package but which can be manipulated out of the package for use. An alternative way of stripping is by deforming and squeezing the film when it is pulled out through a suitable spout. An example is shown in FIGURE 10 in which the container 28 has a relatively narrow neck 29 normally closed by a cap 31 which is removed to gain access to the terminals of the heating film. When the contents have been heated, the film is withdrawn through the neck which serves to squeeze and strip the film. A temperature indicating mark of an ink which changes colour at the desired temperature is shown at 32. This figure also shows in chain lines at 33 a spring grip connector by which connection to the terminals is made. Such a connector can be used with the examples shown in FIGURES 1 to 9 and others described below. It will be understood that the film has two terminal areas appropriately located to be contacted by the spring clip connector.

The configuration of the heating film may also be used for subdividing the package. Thus it may subdivide composite dishes in one pack or separate portions in a large, multiple pack. FIGURE 8 illustrates one such possibility.

Heating tapes can be used as heating films in a great variety of configurations and may be pulled out in pieces when it is desired to keep the food warm by the length of tape remaining in the food package and consume only a part of the whole package. This is particularly suitable for packages used in vending machines. The heating tapes used for this purpose preferably have perforations at all repeat lengths in order to facilitate tearing them there when they are pulled out.

The separation of food and heating film is eased by giving the heating film an anti-adhesive surface. Cellophane; polythene film, the outside of which has not been treated, e.g. oxidised, for the promotion of printing; polyester film, such as "Melinex" film produced by Imperial Chemical Industries Ltd., Millbank, London SW.1., silicone-treated paper or parchment; and very smooth aluminium foil are examples of suitable anti-adhesive heating film materials. For many watery foods, however, it is quite sufficient to use oily or varnished or glossy laminated paper, while for fatty foods papers with a fat repellant, hygroscopic impregnant, such as glycerine, gum or jelly are suitable.

Heating films designed to reach only a low temperature are conveniently made by laminating a slit and expanded aluminum foil pattern between two sheets of paper which has been or is thereafter coated with an anti-adhesive film. For higher temperature films the aluminum foil pattern itself is preferably anodised and bonded between two aluminum foils which are anodised at least on the inside. The bonding is preferably effected by means of a sodium or potassium silicate adhesive. The two anodised aluminium foils are preferably at least 0.002 inch (0.05 mm.) thick. They leave the terminals of the foil pattern free on both sides.

The terminals of the foil pattern of the heating film are usually supported on one side by a layer of paper or plastic film. They are folded back into the food pack and become generally accessible only by at least partly unwrapping the food package, opening the tin or tearing off a seal. This access procedure ensures that, provided a vent has to be produced or uncovered in order to heat the food properly, this is automatically done prior to the attachment of the contact clip to the terminal. It also shows that the food has not been heated before by another would-be consumer.

The positioning of the heating film inside the food package makes it easy to ascertain the time when the whole food pack has been heated sufficiently, as the food layer nearest the surface of the pack will be the last to reach the desired temperature. It is therefore possible to indicate the proper heating effect by printing or otherwise applying an easily visible mark (e.g. as at 32 FIGURE 10) on an area of the food wrapping contacting the food layer which is most distant from the heating film with a temperature indicating ink or paint. A non-reversible ink or paint is proposed which changes color once the specified temperature has been reached and does not go back to its former colour. It forms a further safeguard showing that the food pack has not been heated before.

Another device associated with the food pack can be a fusible link in the pattern of the heating foil which would only blow if the normal current heats it while the heated food surrounding it is so hot that it prevents a sufficient degree of heat conduction away from the fuse. Such a fusible link is preferably situated in a folded-up part of the heating film near the surface of the food pack and away from the main heat-transmitting surface of the heating film itself.

Another type of fuse is a piece of low-melting alloy which is not substantially heated by the current passing through it, but gets hot by contact with the heated food. It is held under stress. When it has reached its melting or softening temperature its resistance to the stress disappears and the heating circuit is disrupted or an alarm raised. A similar effect can be obtained by using a piece of plastic, wax or adhesive which softens at the desired temperature. The adhesive may keep the package closed until it flies open automatically at the predetermined temperature when the bond strength of the adhesive fails. If the packing material is made of a suitable thermoplastic material a heat seal may be used instead of the special heat-sensitive adhesive.

A satchel made of an elastomeric flat-lying tubular plastic film or another easily expanding material and filled with an alcohol, water, or another suitable liquid, or with a blowing agent, such as used for producing plastic foams, may be associated with the heating film or be placed on the surface of the pack. At the predetermined temperature the vapour- or gas-pressure in the satchel rises quickly and expands it considerably. This expansion is used to either break the heating film circuit or start an alarm. It thus fulfills a similar function to a thermostatic element, but is not reliable for repeated operation and is so simple and cheap that it can be associated with the heating film, eating appliance or package and be discarded with it.

A whistle is another suitable and dispensible alarm device which can be incorporated in, or associated with the heating film, package or an eating appliance. Where the food to be heated develops steam at the right temperature, this steam can be made to work the whistle; alternatively the whistle can be actuated by the vapour or gas developing in the satchel described above.

A very simple form of whistle is proposed, made of the heating film or food packaging material and often being integral with it. Over a small area these materials are made to form two discs which cohere together along their circumference and form a dome in the centre. There each disc has a hole. The dome forms the air chamber and the outside smaller hole the lip of the whistle which— apart from its material—is similar to the whistle used on kettles or as toys. Suitable miniaturizations of other forms of whistles or organ pipes may also be used.

Figure 11:
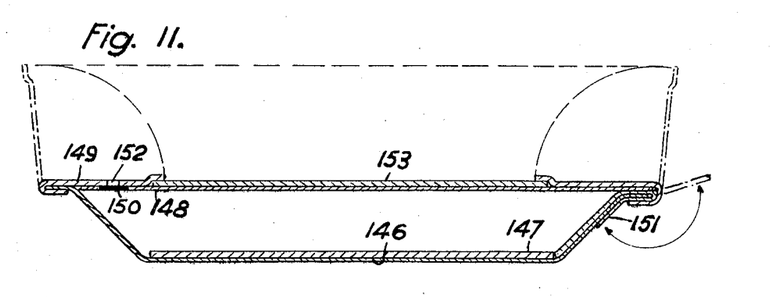
FIGURE 11 is a plan view of an embodiment for use with accelerated dry frozen food

So called accelerated dry frozen food is the product of a recent method of food preservation. It requires to be re-constituted before being eaten or heated by the addition of a measured quantity of water or tenderizing liquid. FIGURE 11 illustrates a package according to the invention, in some ways similar to that shown in FIGURE 1 but modified to deal with the product. The illustrated pack is in the form of a dispensable rigid plate or box 146 with the food resting on a heating film 147. The top of the plate is covered by a paper 148 permeable to liquid but of reasonable wet-strength and a foil or film rim 149 which can be lifted upright to the broken line position to form temporary sidewalls above the plate while leaving at least a permeable paper border along the margin of the plate. At the same time the terminals 151 of the film can be unfolded for connection.

Water or other tenderizing liquid can now be poured quickly on to the top of the plate, perforations 152 in the upturned edges allowing surplus to flow over the side. The liquid seeps through the paper border and reconstitutes the food in the plate. In the closed position shown an airtight seal 150 in the paper 148 is provided covering the perforations 152.

The centre of the paper 148 may if desired be covered by a heating film 153 which can be used to warm the water before it reaches the food and later provides moderate temperature radiant heat to the reconstituted dish from the top. The main heating, however, is contact heating by the heating film 147 at the bottom of the plate.

After the heating cycle this heating film is pulled out between the edge of the plate and the paper and foil which covers the top of the plate whereby any food which adheres to the heating film is stripped off and squeezed back into the plate. Thereafter the top material is removed.

The illustrated pack constitutes a rigid, and if desired airtight, container for accelerated dry frozen food while at the same time it provides for a convenient way of reconstituting, heating and consuming the food in the package.

The provision of heating films inside the pack instead of on its surface not only permits of a high efficiency in heating but also of a very short heating period which can be made a fixed, standard brief heating time for a great variety of widely different packs, by providing for each different type of package an individually designed film. Thus a large heating film surface irrespective of the shape of the pack can be provided, if necessary, by folding the heating film or by placing and spacing several branches of the heating film parallel to each other and thus subdividing the pack into thin slices of large surface. This is particularly suitable for quick thawing and heating of food packs in vending machines or public eating places, canteens, factories, meetings, vehicles, etc. Large surface packs, however, are preferred where no attention is given to or provision is made or relied on for warning or automatic reduction or switching off of the electric supply when the heating cycle is complete. For such cases the area of the outside surface of the pack is made so large that it can, at its maximum predetermined temperature, safely dissipate the total wattage supplied to the heating film. Thus, even if the heating film is left switched on for a long time, it cannot overheat the food but only keep it at its maximum predetermined temperature.

A further example of the disposition of the heating film in the present invention is that it does not necessitate a new special material for wrapping the food, or other substance. Thus all present packaging materials, provided they can, at least for a short while, withstand the temperature of the hot substance, can be used irrespective of the heating being carried out while the substance remains fully enveloped in it or not. Heating of food in an airtight envelope is generally required where the retention of moisture is required during the heating process.

Wrapping materials which do not withstand the hot food temperature are only suitable for food packs which are heated after this material has been removed, or at least bent away to a safe distance from the food surface. This is quite compatible with all food packs which are not to be heated while sealed in an airtight envelope and require at least a vent to be opened before being heated.

In many cases a transparent enclosure of food is desired. Using a heating film as envelope of the food pack defeats such desire as the aluminum foil pattern of the heating film renders it to a large extent non-transparent, even when transparent plastic film is used for the insulating layer or layers of the heating film. Placing it inside the food pack therefore permits the use of the present decorative treatment of the food package, the use of transparent films as cover and wrapping, the use of glass and plastic bottles, boxes, plates and jars maintaining their transparency, and renders it unnecessary to use foil packs for heat transmission from a hotplate or in an oven or boiling bags for heating the pack in hot water.

As stated above one of the purposes of the invention is to standardize the time of the heating required for various types of packages. This is done by associating each particular container of a particular substance with a particular heating film means and designing the size, structure, wattage and positioning of these heating film means within said container so that the desired heating cycle has one of a few selected standard duration times, say three minutes, five minutes or ten minutes. These examples of times are for domestic or table type food packs. (Other varieties, such as packs for vending machines or tubes and nozzles through which substances flow through in small quantities may have times of less than a minute.)

In order to control the switched-on time automatically, any well-known time switch can be used.

A still further purpose of the invention is to reduce the cost of simple heatable food packs generally. The known boiling bags which are designed for immersion into hot water have to be comparatively thick and strong in order to withstand the handling and the internal vapour pressure at the temperature of the boiling water and have to be without a single pinhole. When the boiling bag is suspended in hot water the food runs down to one end of the bag and offers only a small surface for heat transmission. The use of large flat bags thus involves a waste of material from a heat transfer point of view. Keeping the bags lying flat on the other hand requires a large special pan if more than one boiling bag is heated and such pans are unusual. The time and fuel to heat the water are also wasteful compared with electric heating films.

Foil packs lack in rigidity, as their construction is usually a compromise between cost and thickness of the foil while excessive ribbing militates against even heat transfer from a hotplate. Packs which have the heating film of the invention inside can be enveloped by such thinner and cheaper material, and less critical requirements regarding pinholes, strength at hot food temperature, etc. apply to them. Furthermore, the hot food temperature for pre-cooked food is considerably below the boiling point of water, and a number of plastic films for instance are able to stand up to the former temperature but not to the latter. For many packs the cost of the heating film of the invention plus the cost of the cheap, thin, conventional type of wrapping is lower than the cost of a non-electric boiling bag or foil pack. There is always a great saving in time and electricity or equivalent fuel in favour of electric heating film in addition to convenience, labour saving and quality.

A preferred electrical heating film used in the present invention is that disclosed in my Patent No. 3,283,284 to which reference may be made for greater detail. A typical film is illustrated by FIGURES 12 to 16 and it comprises a metallic foil generally indicated by the numeral 196 which is slit into parallel narrow arms 197 forming, after the stock material has been cut into individual films, one or a succession of meander patterns between terminal areas. The slits between the arms 197 are widened into slots 205 by the edges 198 of the arms being folded over and flattened back on to the arms, see FIGURE 14. Preferably, the one surface of the foil which is on the outside of the folded edges is lacquered, anodized, or otherwise covered with an insulating layer so that the neighbouring folded edges of adjacent arms are not only spaced from each other by the width of both folded-over edges, but have also two layers of insulation between themselves which prevent a shortening of the electrical path intended to extend over the full length of the meander arms, if neighbouring arms should for instance accidentally contact each other at their folded-over edges. A pinhole or other failure of the insulating layer covering any folded-over edge is unlikely to occur just opposite to a corresponding failure in the insulation layer on the opposite folded-over edge of the neighbouring arm.

Figure 12:
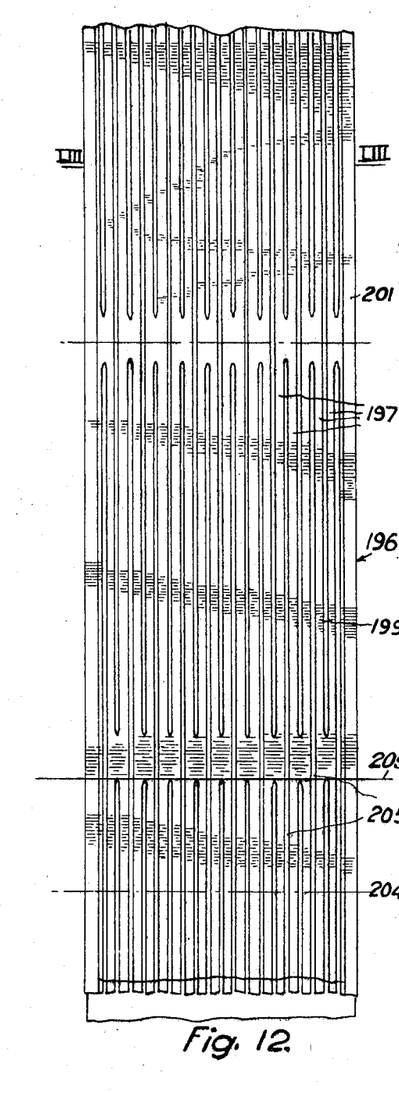
FIGURE 12 is a plan view of part of a stock material from which a preferred construction of heating film used in the invention can be cut

The whole metal foil, or at least the meander arms, are preferably crimped with the crimp lines 199 running across, and preferably at a right angle across, the arms of the meander pattern. The direction of the slits and arms is usually in the longitudinal direction of the foil which is also its rolling or reeling direction.

As shown in the illustrated example the first and last arm of the meander pattern, generally constituting the longitudinal margins 201 of the foil strip itself, are usually wider than the other arms, and are generally used as terminals, or as busbar terminal areas of several parallel meander patterns. They are kept bare of any insulating covering on at least one side over at least part of their width, and these margins are preferably folded over.

An insulating film usually of plastic or paper, but sometimes of asbestos paper is often used to cover one or both sides of the patterned metallic foil, and these insulating covers preferably extend into or are joined by adhesive or even by stitching within the slot between the meander arms in and beyond the outer edges of the metallic foil, so that they solidly fill the spacing between adjacent arms. If plastic materials are used as both top and bottom covering of the metallic foil pattern their junction through the space between the arms of the pattern can be effected by welding.

The side margins (busbars) 201 are left bare over the outer portion of the relatively wide first and last meander arms over the whole length or at least along a chosen terminal area length of each film where the foil should remain bare of insulation cover at least on one side.

Figure 13:
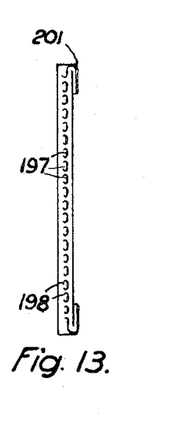
FIGURE 13 is a cross section on the line XIII—XIII of FIGURE 12
Figure 14:
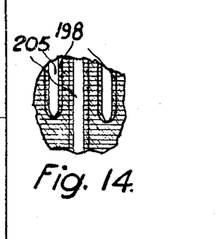
FIGURE 14 is a much enlarged detail of FIGURE 12.

These bare areas can then readily be contacted by a clip or contact such as that above described with reference to FIGURE 10 for supply of electric current and can be folded back along the edges of the insulating cover as above mentioned and shown in FIGURE 13, said edges running longitudinally within the width of the first and last pattern arms. The two folded-back portions form busbars on the top surface of the heating film disposed along its longitudinal edges, and can be readily contacted by a clip or other supply terminal without requiring accurate location.

A form of terminals preferred particularly for heating films which have insulating covers not bonded to the metal foil but only to each othe rin the spaces between the arms and beyond the outside edges of the metal foil entials cutting the film so that the terminal area protrudes into the first and last arms of the preceding pattern of the metal foil, the longitudinal cut within the width of these arms leaving to these arms at least the narrowest width permissible for an arm of that pattern.

The described form of terminal can extend beyond the length of the heating film by nearly the whole length of the heating film preceding it in the roll of patterned metal foil without necessitating any waste in cutting said roll into individual heating films.

Figure 15:
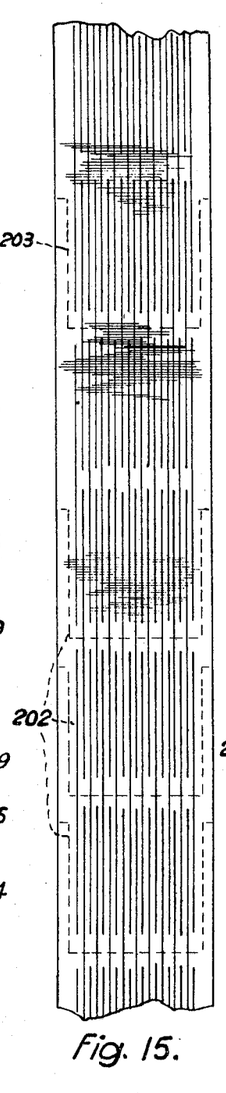
FIGURE 15 is a view on a smaller scale than FIGURE 12 showing how individual heating films of various types of connection may be separated from the stock material and FIGURE 16 is a plan view of another example of heating film.

Examples are shown in FIGURE 15, where the chain lines 202 show how the stock material can be cut into separate films, the pattern of which consists of one single meander circuit, while the chain lines 203 show two the material can be cut into films the pattern of which consists of two parallel meander circuits. In both cases the separated pattern will have terminal arms as above described. Obviously each film could similarly have a pattern consisting of a larger number of parallel meander circuits.

In some cases the tongue-form terminal is less suitable than a terminal form provided by an extension of the heating film over its whole breadth beyond the area heated by the electric current running through the meander arms. Without forming special terminal shapes in either the metal foil pattern or the covering films such extension can be provided by cutting the roll of patterned metal foil across its entire width within the length of the meander pattern preceding the pattern or patterns forming the current path of the individual heating film as shown for example by the cutting line 204 in FIGURE 12. The area of the cut pattern between the lines 204 and 209 thus remains an area of electrically unconnected arms and, when contacted at any two places on the two bare first and last arms 201 at the edges of the film, the current is conducted to the intact meander patterns only.

The busbars 201 can be strengthened by additional foil folded in, or by being made wider and folded several times if required.

The metal foil preferred in most applications of the heating film is aluminum foil of less than 0.002 inch (0.05 mm.) thickness, but the invention is not restricted to this value nor to this material and can be carried out with any resistive film material.

As has already been stated the heating film is often used without insulating film. Anodised or other suitable insulating layers on the surface of the film provide adequate insulation in case neighbouring arms accidentally come into contact in view of the low voltage which is employed.

Figure 16:
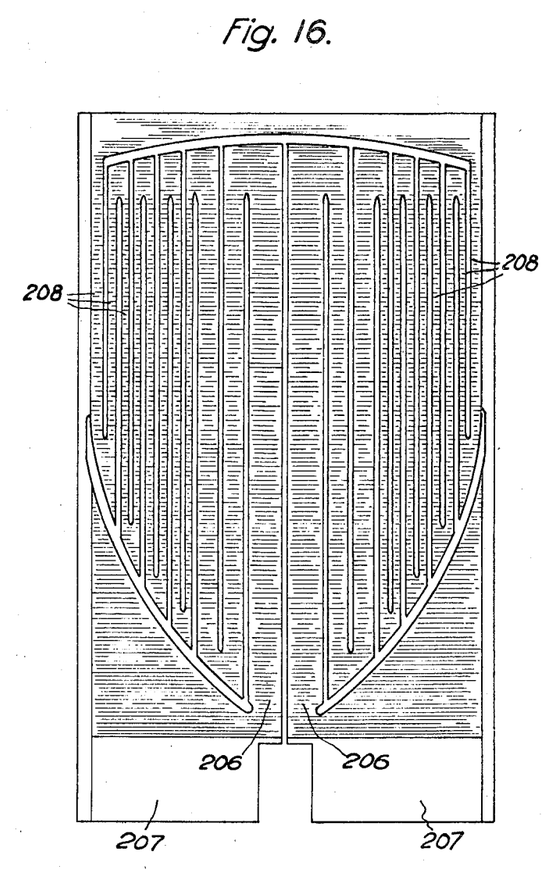

The FIGURES 12 to 15 only show a rectangular pattern produced by slits of equal length. It is often required however to heat packaged material of irregular shape for instance flat fish, by a heating film of irregular shape. An example is shown in FIGURE 16. In the pattern the arms extending from the terminals or busbars 207, that is the first and last arms 206 of the pattern are not at the outside of the pattern but are situated within the pattern area. Also the width of the arms 208 varies to give a desired resistance and therefore heating distribution. Variations in disposition and width of the arms can obviously be made to deal with individual cases. In rectangular patterns as well as in others more than two terminals are sometimes provided, and this provision is more often used with odd-shaped patterns.

What I claim is:

1. A package comprising a dispensible container having a substance therein, a dispensible low voltage electric heating film at least partly within the outermost wall surfaces of the complete package and having terminal means by which connection can be made to a supply without removal of the film from the package and without destruction of the container and means incorporated in the package for permitting a relative displacement between the film and at least part of the substance without destruction of the container, the heating film being in contact with the substance and the package having at least one edge over which said film can be drawn out of the package, said edge stripping at least the bulk of any substance adhering to the heating film and retaining it in the package.

References Cited

UNITED STATES PATENTS

| | | | |
|---|---|---|---|
| 2,648,275 | 8/1953 | Thompson | 219—546 X |
| 2,745,572 | 5/1956 | Talbott | 222—1 |
| 2,844,695 | 7/1958 | McLean | 219—473 |
| 1,416,897 | 5/1922 | Simon | 219—523 |
| 1,887,280 | 11/1932 | Biancalana | 219—437 |
| 2,468,492 | 4/1949 | Gazda | 219—546 |
| 2,522,558 | 9/1950 | Alvarez | 219—436 |
| 2,603,740 | 7/1952 | Delbuttero | 219—543 |
| 2,609,301 | 9/1952 | Lindsey | 99—174 |
| 2,717,947 | 9/1955 | Kuzniar et al. | 331—61 |
| 2,789,201 | 4/1957 | Sherwin | 219—523 |
| 2,808,192 | 10/1957 | Raisin | 99—174 X |
| 3,062,663 | 11/1962 | Furgai | 99—171 |
| 3,100,711 | 8/1963 | Eisler | 219—437 X |
| 2,717,947 | 9/1955 | Kuzniar et al. | 331—61 |
| 2,844,695 | 7/1958 | McLean | 219—473 |
| 2,879,367 | 3/1959 | McLean | 219—385 |
| 3,100,711 | 8/1963 | Eisler | 99—171 |
| 3,296,415 | 1/1967 | Eisler | 219—385 |
| 2,532,014 | 11/1950 | Davis | 219—383 |
| 2,879,367 | 3/1959 | McLean | 219—385 |
| 2,190,084 | 2/1940 | Schlumbohm | 222—1 |
| 2,736,461 | 2/1956 | Dueringer et al. | 222—1 |
| 2,339,974 | 1/1944 | Austin | 99—1 |
| 2,906,620 | 9/1959 | Jung | 99—1 |

VODODYMYR MAYEWSKY, Primary Examiner

U.S. Cl. X.R.

99—1, 171; 126—262; 219—437, 521, 523; 222—146